Figure 1:
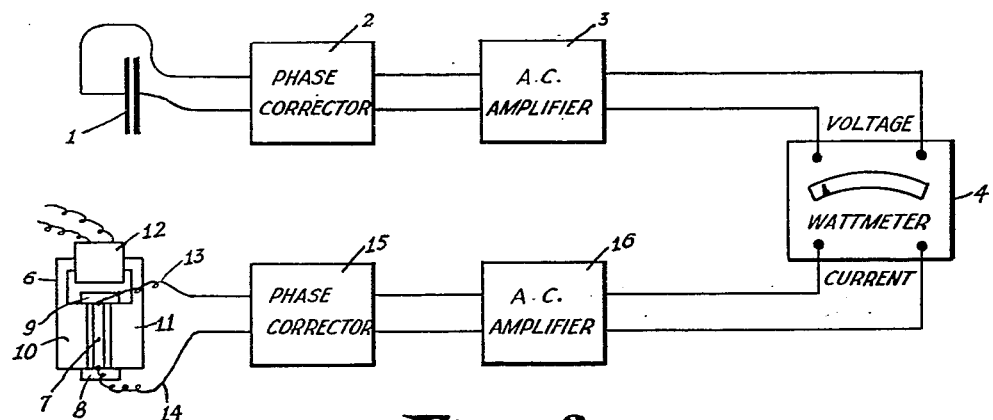

Dec. 27, 1932.  H. F. OLSON  1,892,644

SYSTEM RESPONSIVE TO THE ENERGY FLOW OF SOUND WAVES

Filed May 29, 1931

INVENTOR
HARRY F. OLSON
BY
ATTORNEY

Patented Dec. 27, 1932

1,892,644

UNITED STATES PATENT OFFICE

HARRY F. OLSON, OF NEW YORK, N. Y., ASSIGNOR TO RADIO CORPORATION OF AMERICA, A CORPORATION OF DELAWARE

SYSTEM RESPONSIVE TO THE ENERGY FLOW OF SOUND WAVES

Application filed May 29, 1931. Serial No. 541,095.

This invention relates to a system and apparatus responsive to the energy flow of a sound wave. The system may be used to measure in electrical units, the energy flow of a sound wave at any given point. More particularly the invention relates to an energy flow measuring apparatus which consists of a pair of microphones, one of which is responsive to the pressure component of the sound wave and the other of which is responsive to the velocity component of the sound wave. The outputs of the microphones are amplified and combined in such a manner that the energy flow in the sound wave can be determined at any desired point. A copending application S. N. 540,898, filed concurrently herewith in the name of Irving Wolff, describes a system responsive to the energy density of sound waves.

The energy of the sound wave is made up partly of potential energy and partly of kinetic energy. The potential energy is due to the condensations and rarefactions in the air. At certain regions in a sound wave the air is at a pressure either above or below atmospheric pressure and in returning to normay atmospheric equilibrium the air particles can do work. The kinetic energy in a sound wave is due to the motion of the air particles.

Various types of apparatus such as different kinds of microphones have been used either to determine the pressure component of the sound wave which is a measure of potential energy, or to determine the oscillatory velocity component which is a measure of the kinetic energy. But in no instance, except in the aforementioned copending application has means been devised for measuring simultaneously both the pressure and velocity components of a sound wave. In a plane, progressive sound wave the amplitude of the pressure or velocity component is the same at all points in space, and the energy is uniformly distributed between the component due to pressure and the component due to velocity. Either one of these quantities may therefore be used to determine the other. But in the case of a complex sound wave it is necessary to know the value of both the pressure and velocity components to determine the average flow past any point.

The pressure value, i. e., the energy flow of the pressure component of the sound wave, can be most suitably determined by means of a microphone such as a condenser microphone. A microphone of this type measures essentially the difference between the pressure due to the sound wave and the atmospheric pressure. The microphone should be small enough so that only small changes will be made in the sound field due to the presence of the microphone in the field. The velocity component can be determined by means of a velocity responsive microphone such as the ribbon microphone disclosed in my copending application S. N. 526,598 filed March 31st, 1931.

The object of the invention is to provide efficient and relatively simple apparatus for measuring the energy flow of a sound wave at any given point. The system can be used to compare the energy flow of sound waves set up by different types of loudspeakers. It can also be used to determine the energy flow of a sound wave at different points such as at different parts of an auditorium or theatre, and to control the source of sound from one or more of these points. Further objects of the invention will become apparent on reading the following specification and the appended claims.

The objects are attained by providing a pair of microphones, one of which is primarily responsive to the pressure component of the sound wave, and the other of which is primarily responsive to the velocity component of the sound wave. As the phase of the component is apt to be distorted by one or both of the microphones, phase correctors are associated with one or both of the microphones for providing the necessary phase corrections. It is usually desirable to also associate one or more amplifiers with the microphones to obtain the desired amplification.

Phase correctors are required for the purpose of compensating for certain inherent properties of some microphones. For example: In the case of the condenser microphone which measures the acoustic pressure, the electromotive force generated by the microphone is not in phase with the pressure component of the sound wave but lags behind it. To bring the electromotive force in phase with the pressure component of the sound wave, it is necessary to provide means such as an impedance network for advancing the electromotive force different amounts at different frequencies. Such networks are well known in the art. Certain other types of microphones which generate an electromotive force in phase with the sound wave component, do not require a phase corrector. The outputs from the phase correctors and amplifiers are connected to a suitable apparatus such as a watt meter. The output from the pressure responsive microphone is connected across the voltage input of the watt meter and the output from the velocity responsive microphone is connected across the current input of the watt meter. The watt meter will indicate in electrical units the energy flow of the sound wave passing the point at which the microphones are located.

Figure 2:
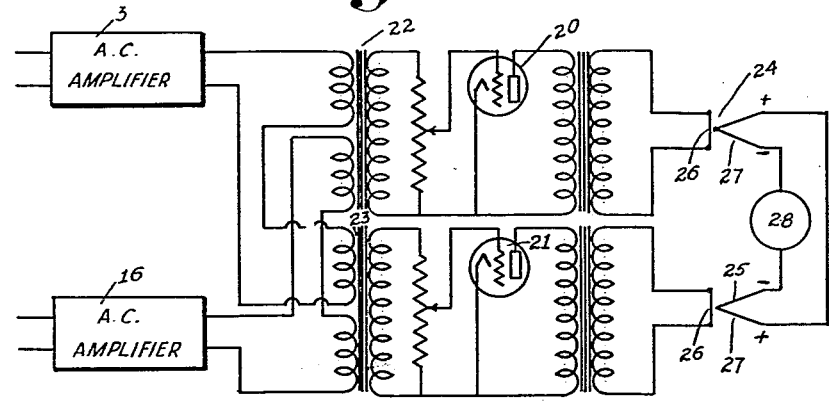
Figure 3:
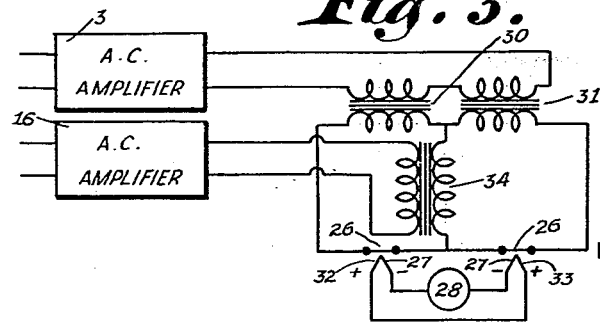

For a more complete disclosure of the invention reference may be made to the following specification which should read in connection with the accompanying drawing, in which Fig. 1 illustrates diagrammatically an approved form of the invention, and Figs. 2 and 3 illustrate modifications of apparatus which can be used in place of the watt meter shown in Fig. 1.

In the drawing 1 indicates diagrammatically a pressure responsive microphone of the condenser type. A microphone of this type usually consists of a fixed condenser plate and a diaphragm or movable condenser plate which is adapted to be vibrated by the pressure component of the sound waves. The condenser microphone 1 is connected with a phase corrector 2. The phase corrector may be of any well known design and consist of an arrangement of inductive and capacitive reactance elements. The output of the phase corrector 2 is connected to the input of the AC amplifier 3 for obtaining the necessary amplification of the currents corresponding to the pressure variations of the sound wave. The output of the AC amplifier is connected to the voltage input terminals of a wattmeter 4.

The velocity microphone preferably consists of a ribbon type microphone such as is described in my aforementioned copending application S. N. 526,598. The microphone which is indicated diagrammatically at 6, consists of a thin ribbon-like member 7 supported at its ends by suitable supporting members 8 and 9 in the magnetic field between two pole pieces 10 and 11. The pole pieces are energized by a suitable winding 12 connected with a source of direct current. Leads 13 and 14 are connected to the ends of the ribbon. When the ribbon is vibrated and moves in the magnetic field between the pole pieces, an electromotive force is set up therein which may be applied by means of the leads 13 and 14 to any measuring or indicating device. By properly proportioning the dimensions of the ribbon 7 and the pole pieces 10 and 11 the microphone may be made to respond to the velocity component of a sound wave.

The output of the velocity responsive microphone 6 is connected through a phase corrector 15 and an AC amplifier 16, to the current input terminals of the watt meter 4. The phase corrector 15 corresponds to the phase corrector 2, and the AC amplifier 16 is the same as the AC amplifier 3. The watt meter 4 will indicate the product of the voltage from the pressure responsive microphone 1 and the current from the velocity responsive microphone 6. The readings of the watt meter will be an accurate indication of the energy flow past the point to which the microphones are located.

The system shown in Fig. 1 may be modified by substituting for the watt meter 4, other apparatus such as is shown in Figs. 2 and 3. The modification shown in Fig. 2 consists of a pair of vacuum tubes 20 and 21, each of which receives energy from both microphones through suitable transformers 22 and 23. Each of the transformers has two primary windings and one secondary winding. One of the primary windings of each transformer is energized from the pressure responsive microphone 1 through the AC amplifier 3 and the other primary winding of each transformer is energized from the velocity responsive microphone 6 through the AC amplifier 16. The outputs from the vacuum tubes 20 and 21 are connected through suitable transformers to separate thermocouple detectors 24 and 25. Each of the thermo-couple detectors consists of a heater element 26 and a thermo-couple 27 arranged with its hot junction positioned adjacent the heater element. The output from each of the tubes 20 and 21 is converted into heat by means of the heater element 26 and then reconverted into measurable electrical energy by means of the thermo-couples 27 in the well known manner. The thermo-couple detectors must be similar in electrical characteristics and they are connected so that their outputs are in opposing relation as shown by the plus and minus signs in the figure. A suitable meter 28 is connected in the circuit which connects the outputs of the thermo-couple detectors. The meter 28 will register the difference in voltage generated by the thermo-couples.

Mathematically the system shown in Figure 2 works as follows: Suppose that the primary windings on the transformers 22 and 23 are connected so that the output from the pressure responsive microphone 1 causes flux in the same direction in the two transformers, and so that the output from the velocity responsive microphone 6 causes opposing flux in the two transformers. If $P \cos(\omega t + \alpha)$ equals the current due to the pressure responsive microphone, and $V \cos(\omega t + \beta)$ the current due to the velocity responsive microphone, the output of the one thermo-couple will be proportionate to $P^2 \cos^2(\omega t + \alpha) + 2 PV \cos(\omega t + \alpha) \cos(\omega t + \beta) + V^2 \cos^2(\omega t + \beta)$ and the output of the other thermo-couple proportionate to $P^2 \cos^2(\omega t + \alpha) - 2 PV \cos(\omega t + \alpha) \cos(\omega t + \beta) + V^2 \cos^2(\omega t + \beta)$. The difference of the output of the two thermo-couples is thus proportionate to $4 PV \cos(\omega t + \alpha) \cos(\omega t + \beta)$ which is the product of the currents due to the pressure and velocity microphones and which is the result desired.

In the modification shown in Fig. 3 the output from the pressure responsive microphone 1 after being amplified in the amplifier 3, is supplied to two transformers 30 and 31, the windings of which are arranged so that the currents set up in the secondary circuits oppose each other. The secondary windings of these transformers are each connected in series with the corresponding heater element 26 of two thermo-couple detectors 32 and 33. The circuits are completed through the secondary winding of a transformer 34. The transformer 34 receives energy from the velocity responsive microphone 6 after it is amplified in the AC amplifier 16. The outputs of the thermo-couples 27 are connected to oppose each other in the same manner as in Fig. 2. A meter 28 is connected in the output circuit to register the difference in voltage generated by the thermo-couples.

It is understood that various modifications may be made to the system which I have disclosed and described without departing from the spirit of the invention. For example, different types of pressure and velocity responsive devices may be substituted for those which I have described and furthermore the amplifiers 3 and 16 may in some instances be omitted or placed between the microphones and the phase correctors. It may also be found desirable to have a phase corrector connected with only one of the microphones. It may also be desirable to have phase correctors which will progressively correct the phase depending upon the frequency. In some instances the output from one of the microphones may vary in phase from the energy of the sound wave, with changes in frequency. Various types of watt meters may be used and it may also be found desirable to substitute different types of apparatus for combining the energies of the microphones for the types of apparatus shown. Any or all of these changes may readily suggest themselves to one skilled in the art and I therefore do not desire to be limited to the specific modification shown and described but only by the scope of the appended claims.

What I claim is:

1. The method of measuring the energy flow of a sound wave comprising the steps of (1) converting separately the energy of different components of the sound wave into electrical variations (2) combining the electrical variations to obtain their product and (3) indicating the total energy flow of the sound wave from the product of the electrical variations.

2. The method of measuring the energy flow of a sound wave comprising the steps of (1) converting separately the energy of different components of the sound wave into electrical variations (2) correcting the phase of the electrical variations from each component (3) combining the electrical variations in a manner such as to obtain their product and (4) indicating the product of said electrical variations.

3. The method of measuring the energy flow of a sound wave comprising the steps of (1) converting the energy of the pressure component of the sound wave into electrical variations (2) converting the energy of the velocity component of the sound wave into electrical variations, (3) combining the electrical variations in a manner such as to obtain their product and (4) indicating the total energy flow of the sound wave from the product of the electrical variations.

4. The method of measuring the energy flow of a sound wave comprising the steps of (1) converting energy of the pressure component of the sound wave into electrical variations (2) converting the energy of the velocity component of the sound wave into electrical variations (3) correcting the phase of the electrical variations (4) combining the electrical variations to obtain their product and (5) indicating the product.

5. A system for measuring the energy flow of a sound wave comprising separate means for converting the energy of different components of the sound wave into electrical variations and means for combining the electrical variations and obtaining their instantaneous product.

6. A system responsive to the energy flow of a sound wave comprising separate means for converting the energy of different components of the sound wave into electrical variations, means for correcting the phase of the electrical variations from each component, and means for combining the electrical variations in a manner such as to obtain their product and for utilizing the product of said variations.

7. A system for measuring the energy flow of a sound wave comprising separate means for converting the energy of different components of the sound wave into electrical variations, means for correcting the phase of the electrical variations from at least one of said components, and means for combining the electrical variations after the phase correction in a manner such as to obtain their product, said last mentioned means including apparatus for indicating said product.

8. Apparatus responsive to the energy flow of a sound wave, comprising means for converting the energy of the pressure component of the sound wave into electrical variations, means for converting the energy of the velocity component of the sound wave into electrical variations, and means for obtaining and utilizing the product of the electrical variations.

9. Apparatus for measuring the energy flow of a sound wave, comprising means for converting the energy of the pressure component of the sound wave into electrical variations, means for converting the energy of the velocity component of the sound wave into electrical variations, and means for combining the electrical variations and indicating the total energy flow of the sound wave due to the pressure and velocity components.

10. Apparatus for measuring the energy flow of a sound wave comprising means responsive to the energy flow of the pressure component of the sound wave, means responsive to the energy flow of the velocity component of the sound wave, each of said means having an output in electrical energy, means for correcting the phase of the output of at least one of said means, and means for obtaining and indicating the product of said outputs.

11. Apparatus responsive to the energy flow of a sound wave comprising means responsive to the energy flow of the pressure component of the sound wave, means responsive to the energy flow of the velocity component of the sound wave, each of said means having an output in electrical energy, means for correcting the phase of said outputs, and means for obtaining the instantaneous product of said outputs.

12. Apparatus responsive to the energy flow of a sound wave, comprising means responsive to the energy of the pressure component of the sound wave, additional means responsive to the energy of the velocity component of the sound wave at the same time and at the same point, and means for obtaining the instantaneous product of the two outputs from said means.

13. Apparatus responsive to the energy flow of a sound wave at a given point comprising a microphone responsive to the pressure components of the sound wave, means for correcting the phase of the output of at least one of said microphones, and means for combining and obtaining the product of said outputs.

14. A system for measuring the energy flow of a sound wave, comprising apparatus responsive to the energy of the pressure component of the sound wave, additional apparatus responsive to the energy of the velocity component of the sound wave, and a wattmeter for obtaining the instantaneous product of the outputs from said apparatus.

15. Apparatus for measuring the energy flow of a sound wave at a given point comprising a microphone responsive to the pressure component of the sound wave, a microphone responsive to the velocity component of the sound wave, apparatus for correcting the phase of the outputs of said microphones, and a wattmeter for combining and obtaining the product of said outputs.

16. A system for measuring the energy flow of a sound wave comprising a microphone responsive to the pressure component of a sound wave, a microphone responsive to the velocity component of a sound wave, means for correcting the phase of the microphone outputs, and a wattmeter for combining and obtaining the product of said outputs, the output from said pressure responsive microphone being connected to the one input thereof and the output from said velocity responsive microphone being connected to the other input thereof.

17. Apparatus for measuring the energy flow of a sound wave at a given point comprising a microphone responsive to the pressure component of the sound wave, a microphone responsive to the velocity component of the sound wave, means for correcting the phase of the output of at least one of said microphones, and means for combining and obtaining the product of said outputs, said last mentioned means constituting a wattmeter having the output from said pressure responsive microphone connected to the voltage input thereof and the output from said velocity responsive microphone connected to the current input thereof.

18. A device for measuring the energy of a sound wave comprising a condenser microphone, a ribbon microphone, said condenser microphone being responsive primarily to the pressure component of the sound wave and said ribbon microphone being responsive primarily to the velocity component of the sound wave, means associated with at least one of said microphones for correcting the phase of the electrical output, a wattmeter having voltage and current inputs, connections from the output of said condenser microphone to the voltage input of said wattmeter, and connections from the output of said ribbon microphone to the current input of said wattmeter.

19. A system for measuring the energy of a sound wave comprising a condenser microphone, a ribbon microphone, said condenser microphone being responsive primarily to the pressure component of the sound wave and said ribbon microphone being responsive primarily to the velocity component of the sound wave, means associated with said microphones for correcting the phase of the electrical outputs, a watt meter having voltage and current inputs, connections from the output of said condenser microphone to the voltage input of said watt meter, connections from the output of said ribbon microphone to the current input of said watt meter, and a separate amplifier included in each of said connections.

20. A system responsive to the energy in a sound wave comprising means responsive to the pressure component of the sound wave, means responsive to the velocity component of the sound wave, a pair of thermo-couple detector devices, means for energizing each of said thermo-couple detector devices, from both of the first mentioned means, a circuit for combining the outputs of said thermo-couple devices in an opposing relation, and means actuated by the resulting energy in said circuit.

HARRY F. OLSON.